Figure 1:
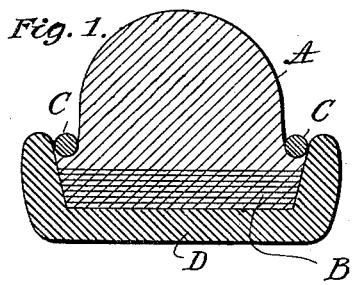

No. 686,858. Patented Nov. 19, 1901.
A. MacMAHON.
VEHICLE WHEEL.
(Application filed Apr. 4, 1901.)
(No Model.)

WITNESSES:
INVENTOR:
ALEXANDER MACMAHON
BY
ATTORNEY

UNITED STATES PATENT OFFICE.

ALEXANDER MacMAHON, OF NEW YORK, N. Y.

VEHICLE-WHEEL.

SPECIFICATION forming part of Letters Patent No. 686,858, dated November 19, 1901.

Application filed April 4, 1901. Serial No. 54,278. (No model.)

*To all whom it may concern:*

Be it known that I, ALEXANDER MACMAHON, a subject of the King of England, residing at New York city, New York, have invented certain new and useful Improvements in Vehicle-Wheels, of which the following is a clear, full, and exact description.

My invention relates to a vehicle-wheel; and my object is to produce a tire which is cheap and which may be securely held in position on the rim. With this object in view I have constructed a tire which has a tread of resilient material with a backing of fabric attached thereto and projecting into a flange at each side of the tread. This tire is adapted to be seated in a hollowed-out portion on the outer circumference of the wheel-rim, and means may be provided for engaging the tire above these flanges to hold the same securely in place.

My invention will be pointed out in the claim.

Several embodiments of my invention are shown in the drawings, in which—

Figure 3:
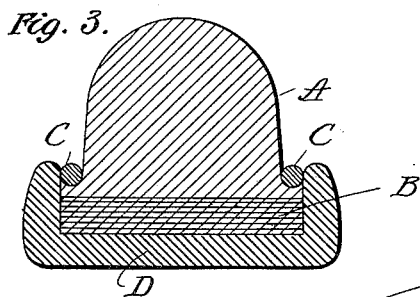
Figure 4:
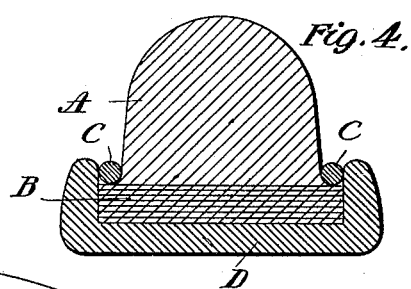
Figure 5:
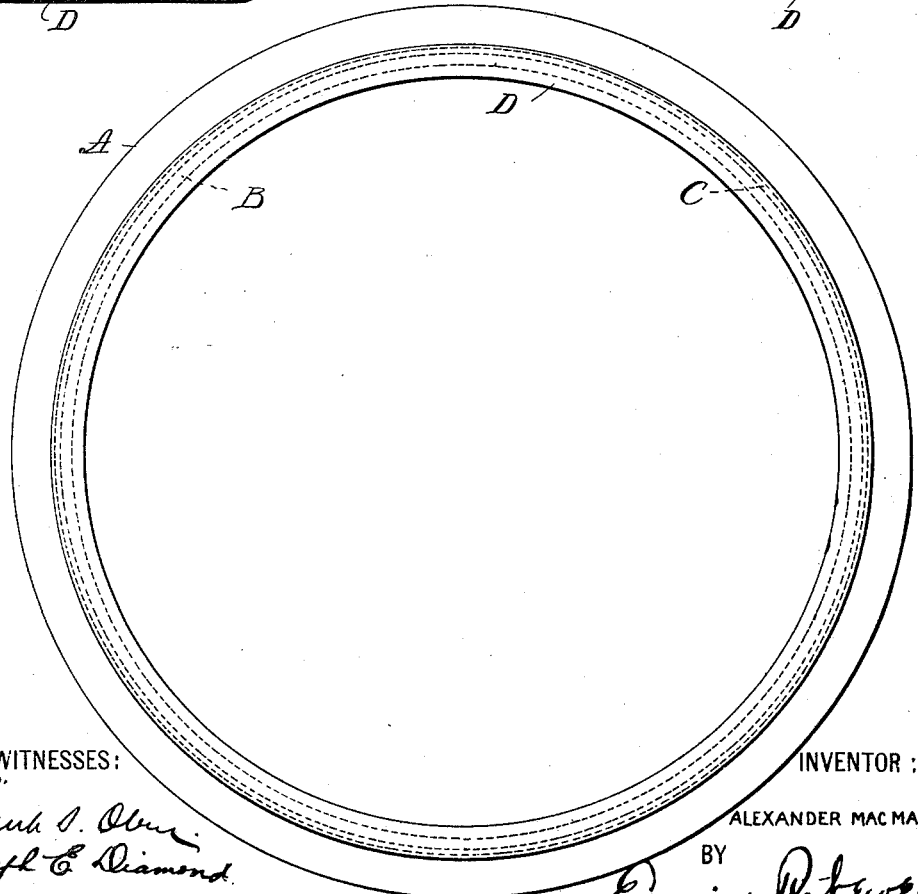

Figures 1 to 4 are sectional views through the tire, fastening means, and rim; and Fig. 5 is a side elevation of a wheel-rim with the tire in place.

In the above views the tread A of the tire is formed of resilient material, preferably rubber, and I prefer to make it solid, as shown. This main portion of the tire has a strengthening backing B of fabric attached thereto, preferably by incorporating the same with the rubber of the tire and vulcanizing the whole together when the tire is formed. I prefer to form this backing of several layers of canvas, as shown, and, if desired, this may be in the form of a plurality of long strips superposed on each other and wider than the tread, as shown in Figs. 1, 3, and 4, or it may be formed of a broad strip of fabric folded over upon itself, as shown in Fig. 3. This backing preferably runs entirely around the inner circumference of the tire. By "backing" I merely mean that it is located below the tread. This backing projects laterally beyond the tread and forms a flange at each side, preferably a continuous flange, running entirely around the tire at each side.

The inner portion of the tire may be located in a hollowed portion running around the outer circumference of the rim D, as shown, and suitable fastening means may be provided above these flanges for securely holding the tire in place. I have shown circular hoops of spring-wire C C, which may be sprung over the edges of the rim, if desired; but I do not limit myself to such fastening means.

As the fabric backing projects beyond the sides of the tread, the strain exerted by the fastening devices will come upon this fabric almost entirely, especially when the fastening device is seated directly on the backing, as in Fig. 4, and as the fabric is much stronger than the rubber of the tire the tire will be much more securely held in place than if the flanges were composed merely of rubber. If the flanges were made entirely of rubber, the hoops would cut the same and the tire would become loose; but the fabric backing may be tightly clamped by the fastening-hoops without this disadvantage and will afford a secure anchorage and yet at the same time a slightly-yielding support for the hoops, so as to allow for slight variations in size of the hoops.

I am aware that many variations from the constructions illustrated and described may be made without departing from the scope of my invention as claimed, and I therefore do not desire to be limited to the specific embodiments herein disclosed.

Figure 2:
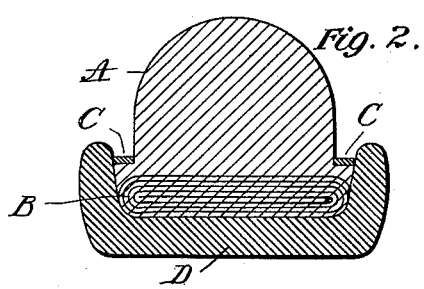

It will be observed that in Figs. 1, 2, and 3 the hoops C do not rest directly upon the fabric backing, but upon the interposed portion of resilient material of the tread. This construction has the advantage that when it is desired to spring the fastening-hoops over the edges of the rim into place the rubber or other resilient material between the hoops and the fabric backing will yield and allow the hoops to be more easily sprung over the opposite side of the rim. Furthermore, this construction not only holds the backing firmly in place, but as a portion of the resilient material from which the tread is formed is located underneath the hoops there is much less danger of the tread being torn away from the fabric backing than might be the case in a construction such as shown in Fig. 4, in which the hoops rest directly upon the fabric backing.

What I claim is—

In a vehicle-wheel in combination a rim having a hollowed-out portion around its outer circumference, a tire having a tread of rubber projecting into a flange at each side of said tread, a backing therefor composed of a layer of non-metallic cloth vulcanized thereto and projecting into a flange at each side of the tread and below said flange of rubber, said tire being located in said hollowed-out portion of said rim and having the flanges thereof located below the upper edges of said rim, and a resilient metallic hoop adapted to be sprung over the edge of said rim at side of said tread above said flanges for holding said tire in place on said rim, one of said flanges of rubber being adapted to allow the sinking of said hoop into said flange at one side of said wheel, while said hoop is being sprung over the edge of said rim at another portion of said wheel.

Signed at New York, N. Y., this 3d day of April, 1901.

ALEXANDER MacMAHON.

Witnesses:
EMERSON R. NEWELL,
O. P. METCALF.